UNITED STATES PATENT OFFICE.

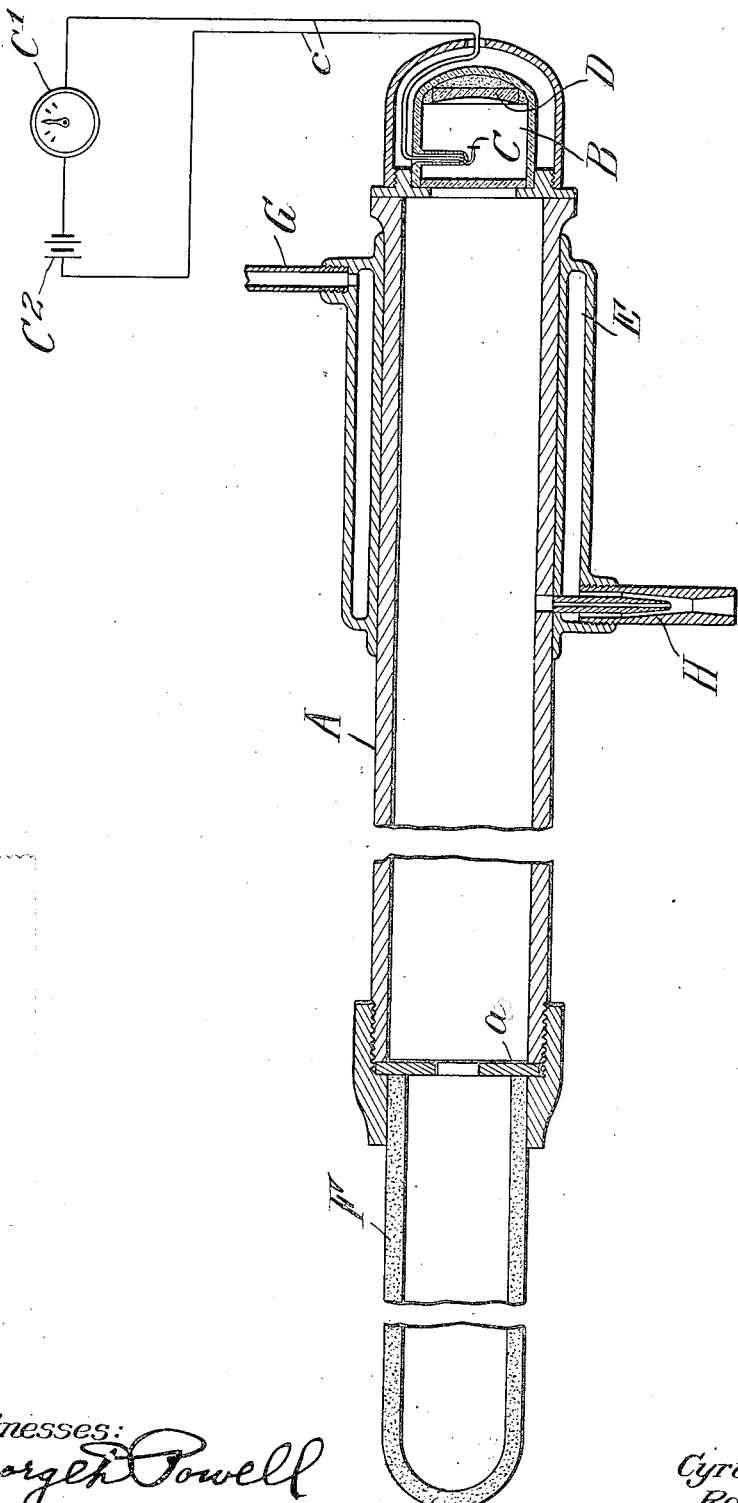

CYRIL T. WALLIS AND RALPH C. SCHWARZ, OF ROCHESTER, NEW YORK, ASSIGNORS TO TAYLOR INSTRUMENT COMPANIES, OF ROCHESTER, NEW YORK, A CORPORATION OF NEW YORK.

RADIATION-PYROMETER.

1,318,516.   Specification of Letters Patent.   Patented Oct. 14, 1919.

Application filed May 3, 1918. Serial No. 232,393.

*To all whom it may concern:*

Be it known that we, CYRIL T. WALLIS and RALPH C. SCHWARZ, a subject of the King of Great Britain and a citizen of the United States, respectively, both residing at Rochester, in the county of Monroe and State of New York, have invented certain new and useful Improvements in Radiation-Pyrometers; and we do hereby declare the following to be a full, clear, and exact description of the same, reference being had to the accompanying drawing, forming a part of this specification, and to the reference characters marked thereon.

Our invention relates to radiation pyrometers for determining temperatures, particularly that type in which the heat sensitive element, such as the hot junction of a thermocouple or an element whose resistance or characteristics are changed when subjected to the radiant heat, said element being contained in or controlling an electric circuit operating a suitable measuring instrument. The objects of the invention are not only to protect the heat sensitive element so that the instrument will accurately indicate slight changes in temperature but also to provide an instrument preferably of the fixed focus type, and to obtain the "black body" condition and insure the correct indication of temperatures by eliminating gases or vapors which might prevent a correct indication.

The first object of the invention is accomplished by isolating the element as by its inclusion in a vacuum chamber or one from which practically all the atmospheric air is exhausted. The second object of the invention is accomplished in the present embodiment by the employment of a closed tube extending from the body, whose temperature is to be measured to the sensitive element, the end of the tube which is subjected to the heat being a fixed distance from the element and the air and gases contained in the tube or generated therein being exhausted therefrom, so that temperature variation of the end of the tube may be accurately indicated. To these and other ends the invention consists in certain improvements and combinations of parts, all as will be hereinafter more fully described, the novel features being pointed out in the claims at the end of the specification.

The accompanying drawing is a sectional view of a pyrometer embodying our improvements.

As shown, the invention is applied to what is known as a fixed focus pyrometer, embodying a tubular body portion A having at its upper end a chamber B in which is located the sensitive element such as a thermocouple C connected by the leads $c, c$ to an electric circuit containing an indicating or recording device, indicated conventionally by $C'$, or if desired a suitable source of electric current such as a battery $C^2$. The interior of the chamber B is exhausted of air or at least contains only an attenuated atmosphere and is preferably made of glass, the leading in wires being sealed in the wall of the chamber in the usual or any preferred manner. By thus isolating the element, its sensitiveness is greatly increased, and it is not subjected to heat from extraneous sources which would affect accurate registration and furthermore its physical characteristics are not subject to variation by oxidation or otherwise. In the fixed focus type of instrument shown, we provide means for focusing the heat rays upon the thermocouple or element, and in the present instance this means consists of a concave reflector D in one of whose conjugate foci the hot junction of the thermocouple or element is located, the other conjugate focus point being the aperture in the ring $a$, located in the tube. The cold junction of the thermocouple, if employed, may be located at any desired position. Instead of the mirror other means might be used to focus the heat rays on the element or thermocouple.

The above constitutes a complete pyrometer equipment for general use, but in many instances the distance between the object whose heat is to be measured and the mirror cannot be fixed, and in many processes the conditions of the material to be heated are such that it does not radiate as a true "black body," and to obtain a fixed focal distance, the "black body" condition, as well as to protect the inner mechanism of the pyrometer we have provided a closed end tube F, fitted to the open end of the receiving tube A. This closed end tube may be of iron, clay or other substance, suited for the particular application, and the inside of the closed end of the tube is the object focused upon. When said end tube is inserted into the furnace, metal bath, etc., it will quickly assume the temperature of its surroundings. Tubes of this nature are more or less porous, and oftentimes admit gases which obstruct the free passage of heat rays to the thermocouple or element, and in order that these may be eliminated, we provide means for removing the air or gases by a suitable exhausting apparatus.

In the present instance, for the double purpose of cooling the outer portion of the tube A, and constitute an aspirator to eliminate the gases we provide said tube with a water jacket E having a water inlet G and an outlet H, the inner portion of the tube A having a small jet tube with a restricted orifice passing into the water outlet pipe H so that the passage of the water through the latter will operate as an ejector or aspirator exhausting the air and gases from the tube and in front of the sensitive element. It will be understood that any other suitable form of aspirator could be employed if desired.

From the above, it will be seen that the instrument, as a whole, is portable, and in practice it is found to be exceedingly accurate and may be used for various purposes where quick and accurate temperature measurements are desired.

We claim as our invention:

1. A pyrometer comprising a closed tube, one end of which is subjected to temperature to be measured, means for exhausting gases therefrom during the use of the instrument, a heat sensitive element in position to be acted upon by the heat radiated from the heated end of the tube, an electrical circuit connected to said element and an indicating device therein.

2. A pyrometer comprising a closed tube, one end of which is subjected to the temperature to be measured, a heat sensitive element arranged in a fixed position relative to said heated end of the tube, means for focusing the heat rays from said heated end of the tube upon said element, and an aspirator for removing gases from the interior of the tube.

3. A pyrometer comprising a closed tube, one end of which is subjected to the temperature to be measured, a vacuum chamber, a heat sensitive element located in said chamber and in fixed relation to said heated end of the tube, and means for exhausting gases from the interior of the tube.

4. A pyrometer comprising a closed tube, one end of which is subjected to the temperature to be measured, a heat sensitive element arranged in fixed relation to said heated end, a water jacket for the tube, an aspirator for exhausting gases from the interior of the tube operated by the water flowing through the jacket.

5. A pyrometer comprising a closed tube, one end of which is subjected to the temperature to be measured, a heat sensitive element arranged in fixed relation to said heated end, an aspirator connected to the interior of the tube, and a water jacket for the tube having inlet and outlet passages.

CYRIL T. WALLIS.
RALPH C. SCHWARZ.